C. PACK AND H. H. DOEHLER.
BEARING.
APPLICATION FILED JULY 26, 1917.

1,333,336. Patented Mar. 9, 1920.

Charles Pack
Herman H. Doehler
Inventors.
By their Attorney
Frank P. Wentworth

UNITED STATES PATENT OFFICE.

CHARLES PACK, OF BROOKLYN, NEW YORK, AND HERMAN H. DOEHLER, OF TOLEDO, OHIO, ASSIGNORS TO DOEHLER DIE CASTING COMPANY, OF BROOKLYN, NEW YORK, A CORPORATION OF NEW YORK.

BEARING.

1,333,336.   Specification of Letters Patent.   Patented Mar. 9, 1920.

Application filed July 26, 1917. Serial No. 182,820.

*To all whom it may concern:*

Be it known that we, CHARLES PACK and HERMAN H. DOEHLER, both citizens of the United States, residing, respectively, at the borough of Brooklyn, city of New York, county of Kings, and State of New York, and at Toledo, county of Lucas, and State of Ohio, have invented certain new and useful Improvements in Bearings, of which the following is a specification, reference being had therein to the accompanying drawings, which form a part thereof.

Our invention relates to bearings and more particularly to a type thereof which has an outer shell having sufficient inherent strength to resist the crushing strains to which the bearing is subjected; and a lining of anti-friction metal, the bearing in its entirety being adapted to be assembled in relation to the shaft mounted therein, and related parts, without requiring any substantial fitting excepting possibly a light scraping to fit it to a particular shaft.

Heretofore, bearings of this general type have been made and successfully used, the outer shell being formed of brass and the inner shell being formed of different anti-friction metals. Such bearings while highly satisfactory in use, are heavy and when a large number of them is used in connection with a small machine, the aggregate weight is so considerable as to be undesirable. This condition is particularly true with bearings which are carried by moving parts of a mechanism, or which are used in connection with engines employed in automobiles, airplanes, or other machines, where the weight per H. P. of the engine is a material factor.

With these conditions in mind, we have produced a bearing which while very much lighter in weight than the ordinary babbitt lined brass bearing, will present a composite structure, the shell of which will be sufficiently strong to resist the ordinary stresses of use, and the lining of which will consist of anti-friction metal so bonded to the shell as to avoid all tendency toward a separation of the shell and its lining under stresses of use.

A bearing made in accordance with our invention, is not only more desirable than babbitt lined brass bearings, for use in machines where the gross weight is a material factor, but our improved bearing may be quickly and economically produced by manufacturing practices which while they may be employed with this type of bearing, cannot be employed in producing babbitt lined brass bearing.

The invention consists primarily in a bearing embodying therein a shell formed of an aluminum base alloy, a lining for said shell composed of anti-friction metal and an interposed metallic stratum bonded to said shell and to said lining; and in such other novel features of construction and combination of parts as are hereinafter set forth and described and more particularly pointed out in the claims hereto appended.

Referring to the drawings.

Like letters refer to like parts in both of said views.

Figure 1:
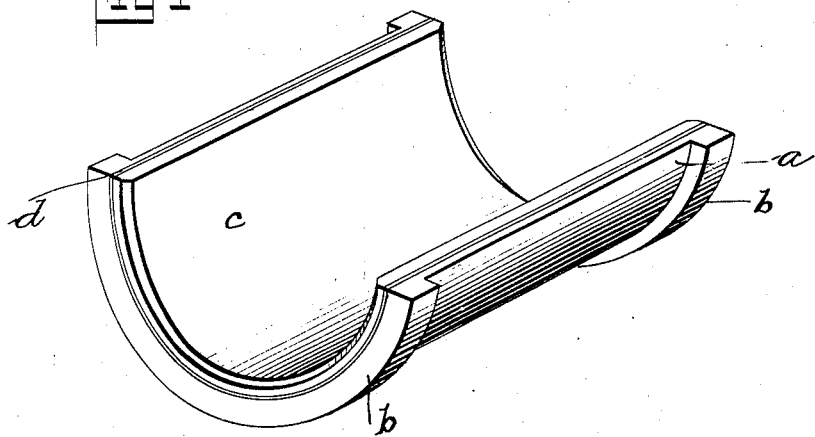
Figure 1 is a perspective view of a bearing embodying our invention.
Figure 2:
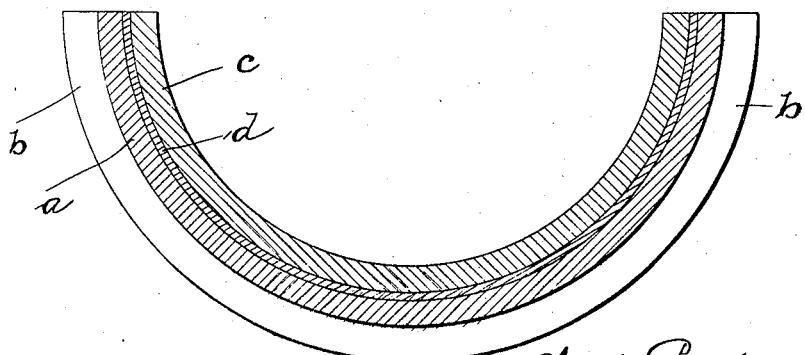
Fig. 2 is a transverse section therethrough.

In the embodiment of the invention shown in the accompanying drawings, the shell $a$ is shown as being an ordinary half cylindrical shell with the usual flanges $b$. The outside contour of this shell is immaterial to this invention, it being capable of indefinite variation to adapt it to differently shaped coöperating machine parts. This shell is formed of an aluminum base alloy containing sufficient copper to give the desired tensile strength, and surface finish to the shell. Preferably, we employ an alloy containing copper in excess of that ordinarily employed in commercial aluminum alloy, or a copper content in excess of 8%.

We have secured highly satisfactory results by casting this shell in a metal mold, this practice not only resulting in a shell of the desired dimensions and finish, without the necessity of subsequent machine finishing, but also in a shell having a chilled outer stratum which will increase the wearing properties and the compression strength of the casting. This last characteristic is highly desirable.

Within the shell $a$ is a facing or lining $c$ of anti-friction metal having either a lead or a tin base. This lining is formed by casting it directly against the previously formed shell, or rather against an intermediate stratum $d$ bonded to the aluminum shell. The mere act of pouring or injecting the anti-friction metal, while in a molten state, serves to bond this metal to the intermediate stratum *d*, which ordinarily is a tin alloy, resulting in the formation of a thin solder joint, between the shell and the anti-friction lining or facing therefor.

The presence of a high percentage of copper in the aluminum alloy above referred to, facilitates the formation of a satisfactory bond between the shell and the lining or facing therefor.

A bearing made in accordance with our invention, while sufficiently strong to stand the ordinary stresses of use, is in its entirety very much lighter than bearings heretofore used. This particularly adapts the bearing for use upon moving parts wherein it is desirable to reduce to a minimum the moving inertia to secure better mechanical conditions in a machine. By using an aluminum alloy shell, and an anti-friction lining bonded or soldered thereto, a substantial, unitary structure is secured, the line of demarcation between the several strata present in the structure, being imperceptible in the finished product.

The intermediate stratum between the shell and the lining or facing, combines with the metal of both these portions of the bearing, in a manner to avoid any well defined line of demarcation between these two portions. In the drawings for purpose of illustration, the thickness of the anti-friction lining of the shell and the bonding stratum between same, is merely illustrative and not in accord with the actual conditions in the finished bearing.

The thickness of the inner facing may vary in different bearings, and it is not our intention to limit the invention to the use of such a facing completely covering the entire inner wall of the shell; it being apparent that various forms of interlocks and depressions now used in applying babbitt lining to brass shells may be used without departing from the spirit and scope of the invention, although we find that the use of such a supplemental bond between the shell and the lining is not essential.

It should be noted that the bearing described herein is of a high heat conductivity in comparison with the bronze- or brass-backed bearings of the prior art, at the temperatures which are encountered by the bearing in practice. This is for the reason that the aluminum base shell is of a much higher heat conductivity at such temperatures than the bronze or brass shells of the prior bearings. For example, an alloy of aluminum 90%, copper 10%, within this invention, has been found to have three times the heat conductivity, at 120° C., of a bronze commonly used in making bearings, having the composition copper 84, tin 5, lead 9 and zinc 2. The bearing described and claimed herein has an exceptionally long life in service, because of its superior heat conductivity.

Having described the invention, what we claim as new and desire to have protected by Letters Patent is:—

1. A bearing embodying therein a shell formed of an aluminum base alloy, a lining for said shell composed of anti-friction metal and an interposed metallic stratum bonded to said shell and said lining.

2. A bearing embodying therein a shell formed of an aluminum base alloy having a copper content in excess of 8%, a lining for said shell composed of anti-friction metal and a solder joint between said shell and said lining, of a character adapted to combine with the metal of the shell and the lining.

3. A bearing embodying therein a dense cast shell formed of an aluminum base alloy, and having a chilled outer surface, a lining for said shell composed of anti-friction metal and an interposed metallic stratum bonded to said shell and said lining.

4. A bearing embodying therein a cast shell formed of an aluminum base alloy having a copper content in excess of 8%, said shell having a chilled outer surface, a lining for said shell composed of antifriction metal and an interposed metallic stratum bonded to said shell and said lining.

5. A bearing embodying therein a dense cast shell formed of an aluminum base alloy having a copper content in excess of 8%; and having a chilled outer surface, a lining for said shell composed of anti-friction metal, and an interposed thin metallic stratum, comprising a tin alloy, bonded to said shell and lining, the interposed stratum being of a character adapted to combine with the metal of the shell and the lining.

6. A bearing embodying therein a shell formed of an aluminum base alloy of low specific gravity and high heat conductivity in comparison with bronze, and of high compressive strength in comparison with unhardened cast aluminum or bronze, a lining for said shell composed of anti-friction metal, and an interposed metallic stratum bonded to said shell and to said lining.

7. A bearing embodying therein a dense shell formed of an aluminum base alloy, and having a hardened outer surface, a lining for said shell composed of anti-friction metal, and an interposed metallic stratum bonded to said shell and said lining.

In witness whereof, we hereunto affix our signatures in the presence of two subscribing witnesses, this 30th day of June, 1917.

CHARLES PACK.
HERMAN H. DOEHLER.

Witnesses:
F. T. WENTWORTH,
OTTO A. SCHROEDER.